United States Patent
Herzog et al.

(10) Patent No.: US 11,148,366 B2
(45) Date of Patent: Oct. 19, 2021

(54) CONSTRUCTION CHAMBER FOR AN APPARATUS FOR ADDITIVE MANUFACTURING OF THREE-DIMENSIONAL OBJECTS

(71) Applicant: CL SCHUTZRECHTSVERWALTUNGS GMBH, Lichtenfels (DE)

(72) Inventors: Frank Herzog, Lichtenfels (DE); Florian Bechmann, Lichtenfels (DE); Frank Schödel, Kronach (DE)

(73) Assignee: Concept Laser GmbH, Lichtenfels (DE)

( * ) Notice: Subject to any disclaimer, the term of this patent is extended or adjusted under 35 U.S.C. 154(b) by 373 days.

(21) Appl. No.: 15/663,701

(22) Filed: Jul. 28, 2017

(65) Prior Publication Data
US 2018/0029295 A1 Feb. 1, 2018

(30) Foreign Application Priority Data
Jul. 29, 2016 (DE) .......................... 102016114057.0

(51) Int. Cl.
*B29C 64/25* (2017.01)
*B29C 64/245* (2017.01)
(Continued)

(52) U.S. Cl.
CPC .............. *B29C 64/25* (2017.08); *B22F 12/00* (2021.01); *B23K 26/127* (2013.01);
(Continued)

(58) Field of Classification Search
CPC ..... B29C 64/25; B29C 64/153; B29C 64/245; B29C 64/255; B29C 39/26; B29C 39/32;
(Continued)

(56) References Cited

U.S. PATENT DOCUMENTS

| 7,351,051 B2 | 4/2008 | Hagiwara | |
| 2013/0108726 A1* | 5/2013 | Uckelmann | B33Y 30/00 425/174.4 |

(Continued)

FOREIGN PATENT DOCUMENTS

| CN | 104640652 A | 5/2015 |
| CN | 105722665 A | 6/2016 |

(Continued)

OTHER PUBLICATIONS

Sysconformwork ("Concrete Column Formwork", http://www.youtube.com/watch?v=n4JHwkhkA_E, video published Apr. 15, 2016, last accessed Mar. 24, 2021 (Year: 2016).*

(Continued)

*Primary Examiner* — Joseph S Del Sole
*Assistant Examiner* — Lawrence D. Hohenbrink, Jr.
(74) *Attorney, Agent, or Firm* — Dority & Manning, P.A.

(57) ABSTRACT

The invention relates to a construction chamber (1) for an apparatus for additive manufacturing of three-dimensional objects, comprising a construction chamber base body (2) which limits a construction volume (4) forming a construction room (3), wherein the construction chamber base body (2) is formed segmented in several construction chamber base body segments (2a, 2b) that can be attached or are attached to each other forming the construction chamber base body (2).

17 Claims, 2 Drawing Sheets

(51) Int. Cl.
| | |
|---|---|
| *B22F 12/00* | (2021.01) |
| *B33Y 30/00* | (2015.01) |
| *B33Y 40/00* | (2020.01) |
| *B29C 64/153* | (2017.01) |
| *B23K 26/12* | (2014.01) |
| *F16B 4/00* | (2006.01) |
| *F16B 5/02* | (2006.01) |
| *F16B 7/18* | (2006.01) |
| *B29C 64/255* | (2017.01) |
| *B22F 10/10* | (2021.01) |
| *B29C 39/32* | (2006.01) |
| *B28B 7/26* | (2006.01) |
| *B29C 39/26* | (2006.01) |

(52) U.S. Cl.
CPC .......... *B29C 64/153* (2017.08); *B29C 64/245* (2017.08); *B33Y 30/00* (2014.12); *B33Y 40/00* (2014.12); *F16B 4/004* (2013.01); *F16B 5/0291* (2013.01); *B22F 10/10* (2021.01); *B28B 7/26* (2013.01); *B28B 7/266* (2013.01); *B29C 39/26* (2013.01); *B29C 39/32* (2013.01); *B29C 64/255* (2017.08); *F16B 7/182* (2013.01)

(58) Field of Classification Search
CPC ....... B33Y 30/00; B33Y 40/00; B22F 3/1055; B22F 2003/1056; B22F 10/10; B22F 12/00; B23K 26/127; F16B 4/004; F16B 5/0291; F16B 7/182; B28B 7/26; B28B 7/266
USPC ........................................................ 425/375
See application file for complete search history.

(56) References Cited

U.S. PATENT DOCUMENTS

| | | | |
|---|---|---|---|
| 2014/0302187 A1 | 10/2014 | Pawlikowski et al. | |
| 2015/0202687 A1* | 7/2015 | Pialot | B33Y 30/00 419/55 |
| 2016/0243618 A1* | 8/2016 | Heugel | B22F 3/24 |

FOREIGN PATENT DOCUMENTS

| | | |
|---|---|---|
| DE | 102009020987 A1 | 11/2010 |
| DE | 202010005162 U1 | 11/2010 |
| DE | 102010020416 A1 | 11/2011 |
| DE | 102015000003 A1 | 7/2016 |
| EP | 2289652 A1 | 3/2011 |
| JP | 2007030303 A | 2/2007 |
| WO | WO2014020085 A2 | 2/2014 |

OTHER PUBLICATIONS

European Search Report Corresponding to Application No. 17172785 dated Nov. 27, 2017.
Machine Translated Japanese Office Action Corresponding to Application No. 2017133330 dated Aug. 21, 2018.
Chinese Office Action Corresponding to Application No. 201710629318 dated Feb. 19, 2019.
European Search Report Corresponding to Application No. 19174599 dated Sep. 4, 2019.
Chinese Search Report and Office Action Corresponding to Application No. 201710629318 dated Jul. 29, 2020.

* cited by examiner

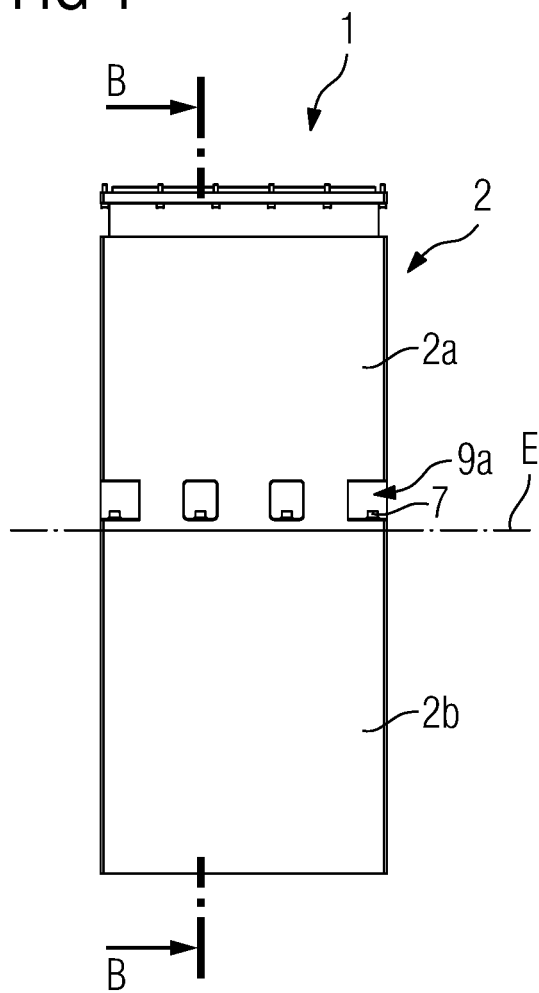

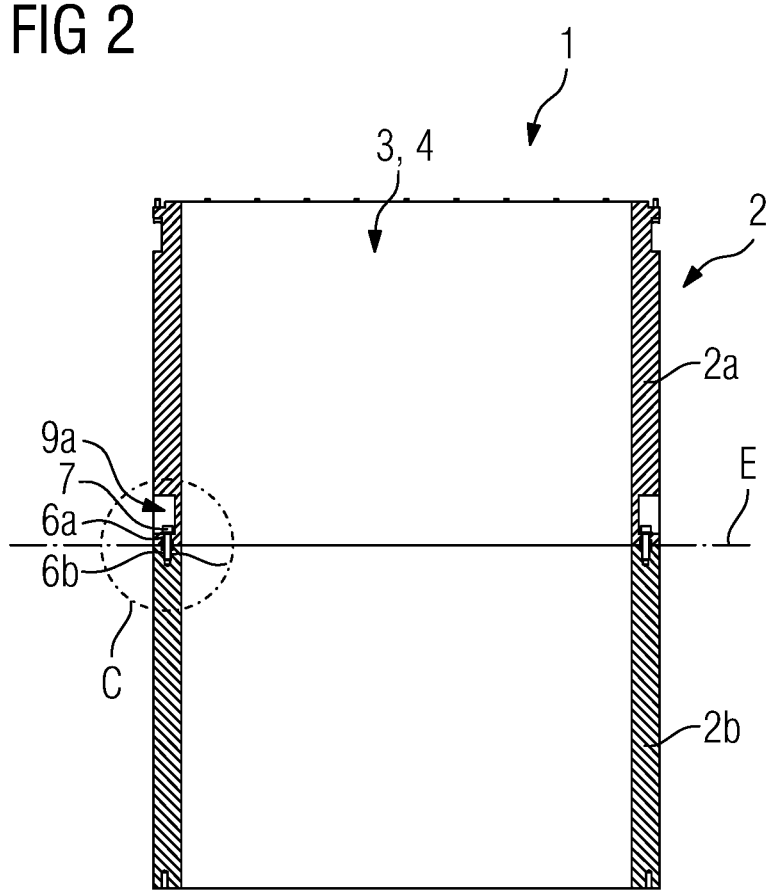
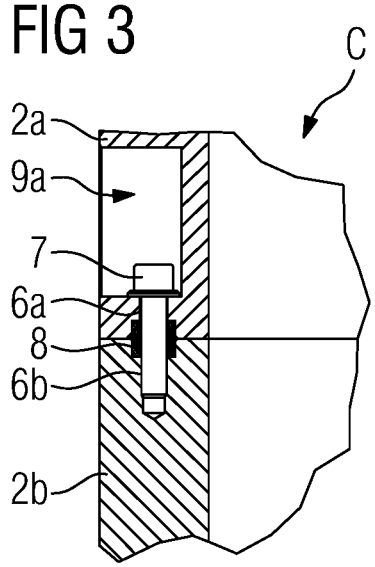

CONSTRUCTION CHAMBER FOR AN APPARATUS FOR ADDITIVE MANUFACTURING OF THREE-DIMENSIONAL OBJECTS

CROSS-REFERENCE TO RELATED APPLICATIONS

This application claims priority to German Patent Application serial no. 10 2016 114 057.0 filed Jul. 29, 2016, the contents of which is incorporated herein by reference in its entirety as if set forth verbatim.

Construction chamber for an apparatus for additive manufacturing of three-dimensional objects The invention relates to a construction chamber for an apparatus for additive manufacturing of three-dimensional objects, comprising a construction chamber base body which limits a construction volume forming a construction room.

Such construction chambers are known in connection with additive manufacturing of three-dimensional objects, i.e. especially technical components or component groups. Appropriate construction chambers comprise a construction chamber base body, which limits a construction volume forming a construction room.

Manufacturing of appropriate construction chambers is typically done by machining processes. The construction chamber base body is manufactured by a machining process, i.e. especially a milling process, from a block-shaped solid workpiece.

Manufacturing of comparatively high construction chambers, i.e. especially construction chambers the construction room or construction volume of which exceeds a maximum height of at least 50 cm, can be problematic with the known manufacturing methods in terms of narrow tolerances requested. This justifies by the fact that correspondingly high construction chambers cannot be manufactured in one production step.

Therefore, the invention is based on the object of providing, in contrast to the above, especially in terms of a simple manufacturing option taking into account given tolerance requirements, an improved construction chamber.

The object is solved by a construction chamber according to claim 1. The dependent claims relate to advantageous embodiments of the construction chamber.

The construction chamber described herein represents a functional component of an apparatus for additive manufacturing of three-dimensional objects. A respective apparatus for additive manufacturing of at least one three-dimensional object (hereinafter in short referred to as "object"), i.e. especially technical components or technical component groups, by successive, selective layer-by-layer exposure and thus solidification of individual construction material layers of a construction material that can be solidified by means of at least one energy beam is provided. The construction material that can be solidified may be metal powder, plastic powder and/or ceramic powder. Metal powders, plastic powders or ceramic powders can also be interpreted to include a powder mixture of different metals, plastics or ceramics. The energy beam can be a laser beam. The apparatus can correspondingly be an apparatus for performing selective laser melting methods (SLM methods in short) or selective laser sintering methods (SLS methods in short), i.e. a selective laser melting apparatus (SLM apparatus) or a selective laser sintering apparatus (SLS apparatus).

The construction chamber is filled with construction material to be solidified in a successive, selective layer-by-layer manner when performing additive manufacturing processes. The additive construction of the respective object or objects to be additively manufactured is performed in the construction chamber. The construction chamber comprises a construction chamber base body limiting a construction room. The construction room forms or includes a construction volume. The construction room can be or is in the section of its bottom completed by a construction plate arranged in the construction room, or the top face thereof (exposed when the construction room is not filled with construction material). The construction plate is typically coupled with a carrying device via which the construction plate is movably supported, especially in a vertical movement direction, relative to the construction chamber base body. The construction chamber, the construction plate and the carrying device can form a construction module and can correspondingly be referred to or considered as such.

Significant to the construction chamber described herein is that the construction chamber base body is formed segmented. Hence the construction chamber base body comprises several construction chamber base body segments that can be attached or are attached to each other in the assembly state of the construction chamber forming the construction chamber base body. The segmentation of the construction chamber base body into the construction chamber base body segments is performed depending on the number of construction chamber base body segments in at least one, possibly more, segmentation planes. A respective segmentation plane can basically be anywhere in the room; respective construction chamber base body segments can principally be arranged in horizontal and/or vertical orientation. Segmentation planes inclined in relation to a horizontal or vertical reference plane are also principally imaginable.

The respective construction chamber base body segments in their geometric structural dimensions are selected such that they can each be manufactured in one production step. The so far problematic production of comparatively high construction chambers, i.e. especially construction chambers the construction room or construction volume of which exceeds a maximum height of at least 50 cm, i.e. possibly having 100 cm or more, with the requested narrow tolerances is hence addressed by a segmentation of the construction chamber into several construction chamber base body segments that can be attached or are attached to each other in the assembly state of the construction chamber forming the construction chamber base body.

With the option of attaching respective construction chamber base body segments to each other, construction chambers of any height can basically be formed. Of course, this also applies to the case of stack-like vertical arrangement or attachment of respective construction chamber base body segments on top of each other. From this it follows that the construction chamber base body is formed segmented preferably in at least one horizontal segmentation plane, wherein the respective construction chamber base body segments when segmenting in the horizontal segmentation plane can be attached or are attached on top of each other in vertical or vertical adjacent arrangement.

The respective construction chamber base body segments can have a (hollow) parallelepiped, hollow cylindrical or an annular disk-shaped base shape. Hence, the construction chamber base body segments each comprise an interior room limited by the walls of the respective construction chamber base body segments, (co)-defining the respective base shape thereof. The respective interior room of construction chamber base body segments forms (in the assembly state of the construction chamber) a part of the construction room or the construction volume. Hence, each construction chamber base body segment typically limits one construction room portion describing an entire inner circumference of the construction room.

Basically, the construction chamber base body segments can be formed geometric structurally identical or can be formed such that they differ in at least one geometric structural parameter, especially the respective height thereof. In geometric structural terms, the construction chamber can hence comprise (several) identical construction chamber base body segments or (several) different construction chamber base body segments. The geometric structural dimensions of the respective construction chamber base body segments can be selected especially in terms of the realization of a certain desired height of the construction chamber or the construction room.

For attachment—the attachment can typically be detached (in a damage-free and non-destructive manner)—of construction chamber base body segments that can be attached or are attached to each other to form the construction chamber base body at least one attachment element can be arranged or formed on each construction chamber base body segment. The respective attachment elements are provided to interact by forming a (detachable) attachment of at least two construction chamber base body segments that are to be connected or that are connected to form the base body. The respective attachment elements can be provided to interact by forming an attachment of at least two construction chamber base body segments that are to be connected or that are connected to form the base body in a form-locked and force-locked manner. This is especially understood to mean that the respective attachment elements are provided to interact with each other by forming a form-locked and/or force-locked connection or are provided to form such a connection.

In respective attachment elements these can hence possibly be corresponding form-locked elements provided to interact with each other by forming a form-locked connection or provided to produce such a connection, or possibly corresponding force-locked elements provided to interact with each other by forming a force-locked connection or provided to produce such a connection. Respective form-locked elements can specifically be formed e.g. as a projection and hence (corresponding) receiver or recess. Consequently, by interaction of corresponding form-locked elements, e.g. a tongue-and-groove-joint or a connection of such a type can be formed. Respective force-locked elements can specifically be formed as bolts or alignment pins and hence (corresponding) receivers or recesses possibly provided with a mating thread. Consequently, by interaction of corresponding force-locked elements, e.g. a bolt or alignment pin-connection or a connection of such a type can be formed.

For that option, according to which the respective attachment elements are provided, to interact by forming an attachment of at least two construction chamber base body segments that are to be connected or are connected to each other to form the base body in a force-locked manner, it is imaginable that the attachment elements are formed at least as attachment receivers or recesses that can at least partially be penetrated by, especially bore-like, attachment bolts, and are at least partially penetrated by a corresponding attachment bolt in the state of being attached to each other. An attachment bolt can be a threaded bolt or a stud bolt. An attachment receiver or recess of a first construction chamber base body segment is formed as a through-hole, an attachment receiver or recess of a second construction chamber base body segment to be connected with the first construction chamber base body segment can be formed as a blind hole. In order to handle respective construction chamber base body segments in any way, each construction chamber base body segment can be provided in the section of an (upper) first edge portion with a through-hole, and in the section of a (lower) first edge portion arranged or formed opposite said through-hole with a blind hole.

Respective attachment receivers or recesses can be arranged or formed in a (cross-sectionally seen) tapered recess section of the respective construction chamber base body segment such that they do not extend the outer dimensions of the respective construction chamber base body segment or the entire construction chamber.

The construction chamber base body segments are typically metal components manufactured by machining, especially milling, operations. Manufacturing the construction chamber base body segments by wire eroding or wire cutting is also imaginable.

The metal material forming the construction chamber base body segments can be a light metal, especially an aluminum or an aluminum alloy. In addition to the comparatively low weight, light metals are characterized by a comparatively simple machinability when it comes to manufacturing.

The geometric structural dimensioning of the construction chamber or the construction room is purposefully designed for additive manufacturing of comparatively large or elongated components or component structures ("large-scale structures"). These can e.g. be components of a motor vehicle, i.e. vehicle body structures like door structures.

Therefore, the construction room can e.g. have a maximum depth of 140 cm, especially in a range of between 80 and 120 cm. Here, of course, upwards and downwards exceptions are possible.

The construction chamber typically has a (hollow) parallelepiped, (hollow) cylindrical base shape.

In addition to the construction chamber, the invention also relates to an apparatus for additive manufacturing of three-dimensional objects. The apparatus, which especially is an SLS apparatus or an SLM apparatus, is characterized in that it comprises at least one construction chamber as described. All embodiments in connection with the construction chamber thus analogously apply to the apparatus.

The invention is explained in more detail by means of exemplary embodiments in the drawings. In which:

FIG. 1, 2 each show a schematic diagram of a construction chamber according to an exemplary embodiment; and FIG. 3 is an enlargement of the individual unit C shown in FIG. 2.

FIG. 1, 2 each show a schematic diagram of a construction chamber 1 according to an exemplary embodiment. The construction chamber 1 in FIG. 1 is shown in a side or front view of the assembly state and is shown in FIG. 2 in a sectional view along the cutting lines B-B shown in FIG. 1. FIG. 3 shows an enlargement of the individual unit C shown in FIG. 2.

The construction chamber 1 represents a functional component of an apparatus (not shown) for additive manufacturing of three-dimensional objects. A respective apparatus for additive manufacturing of one or more three-dimensional objects, i.e. especially technical components or technical component groups, by successive, selective layer-by-layer exposure and thus solidification of individual construction material layers of a construction material (not shown) that can be solidified by means of at least one energy beam (not shown) is provided. The construction material that can be solidified can, for example, be metal powder. A metal powder can also mean a powder mixture of different metals. The energy beam can be a laser beam. The apparatus can be an apparatus for performing selective laser melting methods (SLM methods in short) or selective laser sintering methods (SLS methods in short), i.e. a selective laser melting apparatus (SLM apparatus) or a selective laser sintering apparatus (SLS apparatus).

The construction chamber 1 is filled with construction material to be solidified in a successive, selective layer-by-layer manner when performing additive manufacturing processes. The additive construction of the respective object or objects to be additively manufactured is performed in the construction chamber 1. The construction chamber 1 comprises a construction chamber base body 2 limiting a construction room 3. The construction room 3 forms or includes a construction volume 4. The construction room 3 can or is in the section of its bottom completed by a construction plate (not shown) arranged in the construction room, or the top face thereof (exposed when the construction room is not filled with construction material). The construction plate is typically coupled with a carrying device via which the construction plate is movably supported, in a vertical movement direction, relative to the construction chamber base body 2. The construction chamber 1, the construction plate and the carrying device can form a construction module and can correspondingly be referred to or considered as such.

From Figure it can be seen that the construction chamber base body 2 is formed segmented. The construction chamber base body 2 comprises several, i.e. in the exemplary embodiment shown in the Figures two, construction chamber base body segments 2a, 2b that can be attached or are attached to each other in the assembly state of the construction chamber 1 forming the construction chamber base body 2. The segmentation of the construction chamber base body 2 into the construction chamber base body segments 2a, 2b is performed depending on the number of construction chamber base body segments 2a, 2b in a horizontal segmentation plane E.

The respective construction chamber base body segments 2a, 2b in its geometric structural dimensions are selected such that they can each be manufactured in one production step. The so far problematic production of comparatively high construction chambers 1, i.e. especially construction chambers 1 the construction room 3 or construction volume 4 of which exceeds a maximum height of at least 50 cm, i.e. possibly having 100 cm or more, with the requested narrow tolerances is hence addressed by the segmentation of the construction chamber 1 into several construction chamber base body segments 2a, 2b.

With the possibility of attaching respective construction chamber base body segments 2a, 2b to each other, construction chambers 1 of any height can basically be formed. This applies to the exemplary embodiment of the stack-like vertical arrangement or attachment of the respective construction chamber base body segments 2a, 2b on top of each other shown in the Figures; the respective construction chamber base body segments 2a, 2b can be attached or are attached to each other vertically on top of each other.

The geometric structural dimensioning of the construction chamber 1 or construction room 3 is designed for additive manufacturing of comparatively large or elongated components or component structures ("large-scale structures"). These can be components of a motor vehicle, i.e. for example vehicle body structures like door structures. Therefore, the construction room 3 has a maximum depth of 140 cm, especially 100 cm. The width of the construction chamber 1 can be 90 cm, the length of the construction chamber 1 can be 50 cm.

The construction chamber 1 or construction chamber base body 2 has a (hollow) parallelepiped base shape. Accordingly, the respective construction chamber base body segments 2a, 2b have a (hollow) parallelepiped base shape. Hence, the construction chamber base body segments 2a, 2b each comprise an interior room (not denoted in more detail) limited by the walls (not denoted in more detail) of the respective construction chamber base body segments, (co-)defining the respective base shape thereof. The respective interior room limited on the side of the construction chamber base body segments forms (in the assembly state of the construction chamber 1) a part of the construction room 3 or the construction volume 4. Hence, each construction chamber base body segment 2a, 2b limits one construction room portion describing an entire inner circumference of the construction room 3.

For attachment—the attachment can typically be detached (in a damage-free and non-destructive manner)—of construction chamber base body segments 2a, 2b that can be or are attached to each other to form the construction chamber base body 2, several attachment elements 6a, 6b are arranged or formed on each construction chamber base body segment 2a, 2b. The respective attachment elements 6a, 6b are provided to interact by forming a (detachable) attachment of the construction chamber base body segments 2a, 2b. In the exemplary embodiment shown in the Figures, the respective attachment elements 6a, 6b are provided to interact by forming an attachment of the two construction chamber base body segments 2a, 2b in a force-locked manner. This is especially understood to mean that the respective attachment elements 6a, 6b are provided to interact with each other by forming a force-locked connection or are provided to form such a connection.

From FIG. 1 it can be seen that on each construction chamber base body segment 2a, 2b several attachment elements 6a, 6b can be arranged or formed (evenly) spread related to the (outer) circumference. The respective attachment elements 6a, 6b of the construction chamber base body segments align with each other in the assembly state of the construction chamber 1, cf. FIG. 1.

In the exemplary embodiment shown in the Figures, the respective attachment elements 6a, 6b are force-locked elements provided to interact with each other by forming a force-locked connection or provided to produce such a connection. The respective attachment elements 6a, 6b of the construction chamber base body segments are formed as attachment receivers or recesses that can at least partially be penetrated by an, especially bore-like, attachment bolt 7 and—as can be seen from FIG. 2, 3—in the state of the construction chamber base body segments 2a, 2b being attached to each other are at least partially penetrated by a corresponding attachment bolt 7. The attachment bolt 7 can be a threaded bolt or a stud bolt, which can (optionally) be centered between the construction chamber base body segments 2a, 2b by a sleeve-like centering element 8 shown in FIG. 2, 3.

An attachment receiver or recess of an upper construction chamber base body segment 2a of the Figure is formed as a through-hole, an attachment receiver or recess of a lower construction chamber base body segment 2b to be connected with the upper construction chamber base body segment 2a is formed as a blind hole. In order to handle respective construction chamber base body segments 2a, 2b in any way, each construction chamber base body segment 2a, 2b can be provided in the section of an (upper) first edge portion with a respective through-hole, and in the section of a (lower) first edge portion arranged or formed opposite said through-hole with a respective blind hole.

From the aforementioned explanations it follows that the force-locked connection of the construction chamber base body segments 2a, 2b is a screw connection.

Apparently, respective attachment receivers or recesses can be arranged or formed in a (cross-sectionally seen) tapered recess section 9a of the respective construction chamber base body segment 2a such that they do not extend the outer dimensions of the respective construction chamber base body segment 2a or the entire construction chamber 1.

Although not shown in the Figures, it is similarly imaginable that the respective attachment elements 6a, 6b possibly are corresponding form-locked elements provided to interact with each other by forming a form-locked connection or provided to produce such a connection. By interaction of corresponding form-locked elements, e.g. a tongue-and-groove-joint or a connection of such a type can be formed.

The construction chamber base body segments 2a, 2b are typically metal components manufactured by machining, especially milling, operation. Manufacturing the construction chamber base body segments 2a, 2b by wire eroding or wire cutting is also imaginable.

The metal material forming the construction chamber base body segments 2a, 2b can be a light metal, especially an aluminum or an aluminum alloy.

The invention claimed is:

1. A construction chamber for an apparatus for additive manufacturing of three-dimensional objects, the construction chamber comprising a construction chamber base body which limits a construction volume forming a construction room, wherein the construction chamber base body comprises:
    a first construction chamber base body segment;
    a second construction chamber base body segment that can be attached or is attached to the first construction chamber base body segment by at least one first attachment element arranged or formed on the first construction chamber base body segment and interacting with at least one second attachment element arranged or formed on the second construction base body segment;
    wherein the second construction chamber base body segment further comprises at least one third attachment element arranged or formed thereon and configured to facilitate a third construction chamber base body segment to be attached to the second construction chamber base body segment at least in part by interacting with at least one fourth attachment element arranged or formed on the third construction chamber base body segment, wherein each of the first, second, and third construction chamber base body segments limits a respective construction room portion describing a full inner perimeter of a corresponding portion of the construction room and co-defining a base shape of the construction room.

2. The construction chamber according to claim 1, wherein the construction chamber base body segment is formed segmented in at least one horizontal segmentation plane, wherein the second construction chamber base body segment can be attached vertically on top of the first construction chamber base body segment.

3. The construction chamber according to claim 1, wherein the first construction chamber base body segment and/or the second construction chamber base body segment has a hollow parallelepiped, a hollow cylindrical, or an annular disk-shaped base shape.

4. The construction chamber according to claim 1, wherein the second construction chamber base body segment is identically formed in geometric structural manner or is formed differently in at least one geometric structural parameter, as compared to the first construction chamber base body segment.

5. The construction chamber according to claim 1, wherein a respective one of the at least one first attachment element is configured to interact with a respective one of the at least one second attachment element, and/or a respective one of the at least one second attachment element is configured to interact with a respective one of the at least one second attachment element, in a form-locked and force-locked manner.

6. The construction chamber according to claim 5, wherein a respective one of the at least one first attachment element is configured to interact with a respective one of the at least one second attachment element, and/or wherein a respective one of the at least one third attachment element is configured to interact with a respective one of the at least one fourth attachment element, in a force-locked manner.

7. The construction chamber according to claim 1, wherein the first construction chamber base body segment and/or the second construction chamber base body segment is a metal component manufactured by a machining operation.

8. The construction chamber according to claim 1, wherein the construction room has a maximum depth of 140 cm, after attaching the second construction chamber base body segment to the first construction chamber base body segment, and/or after attaching the second construction chamber base body segment to the first construction chamber base body segment and the third construction chamber base body segment to the second construction chamber base body segment.

9. An apparatus for additive manufacturing of three-dimensional objects, the apparatus comprising at least one construction chamber according to claim 1.

10. The construction chamber according to one of the claim 1, wherein the at least one first attachment element is or can be attached to the at least one second attachment element at least in part by one or more attachment bolts; and/or wherein the at least one third attachment element is or can be attached to the at least one fourth attachment element at least in part by one or more attachment bolts.

11. The construction chamber according to claim 10, wherein a respective one of the at least one first attachment element, the at least one second attachment element, the at least one third attachment element, and/or the at least one fourth attachment element respectively comprises a through hole or a blind hole.

12. The construction chamber according to claim 11, wherein a respective one of the at least one first attachment element, the at least one second attachment element, the at least one third attachment element, and/or the at least one fourth attachment element respectively comprises a sleeve-like centering element.

13. The construction chamber according to claim 10, wherein a respective one of the at least one first attachment element, the at least one second attachment element, the at least one third attachment element, and/or the at least one fourth attachment element respectively comprises a tapered recess section and a through-hole configured to receive a corresponding one of the one or more attachment bolts.

14. The construction chamber according to claim 1, wherein the construction chamber base body is less than 50 cm in height prior to attaching the second construction chamber base body segment to the first construction chamber base body segment.

15. The construction chamber according to claim 14, wherein the first construction chamber base body segment is less than 50 cm in height.

16. The construction chamber according to claim 6, wherein a respective one of the at least one first attachment element, the at least one second attachment element, the at least one third attachment element, and/or the at least one fourth attachment element comprise an attachment receiver that can at least partially be penetrated by an attachment bolt.

17. The construction chamber according to claim 8, wherein the construction room has a depth in a range between 80 cm and 120 cm.

\* \* \* \* \*